United States Patent [19]
Stafford et al.

[11] 3,763,927
[45] Oct. 9, 1973

[54] HOT WIRE CONTROL FOR VEHICLE AIR CONDITIONING

[75] Inventors: John W. Stafford, Royal Oak; Thomas P. Yasin, Birmingham, both of Mich.

[73] Assignee: General Motors Corporation, Detroit, Mich.

[22] Filed: July 13, 1972

[21] Appl. No.: 271,550

[52] U.S. Cl.......................... 165/23, 165/26, 165/42
[51] Int. Cl............................................... B60h 3/04
[58] Field of Search........................... 165/23, 26, 42

[56] References Cited
UNITED STATES PATENTS
3,428,115   2/1969   Caldwell .............................. 165/23

Primary Examiner—Charles Sukalo
Attorney—C. R. Meland et al.

[57] ABSTRACT

A vehicle air conditioning controller wherein a hot wire sensor is positioned at the outlet ducts of the air conditioner system for sensing the effective temperature of the conditioned air flowing therefrom taking into consideration both air velocity and temperature. The hot wire controls a vacuum transducer which supplies a regulated vacuum to a vacuum motor which positions an air mix damper to control the temperature of the air at the output of the outlet ducts so as to maintain the air flowing therefrom at a predetermined effective temperature. A bimetal temperature sensor is also provided for controlling the speed of a blower motor as a function of compartment temperature.

3 Claims, 2 Drawing Figures

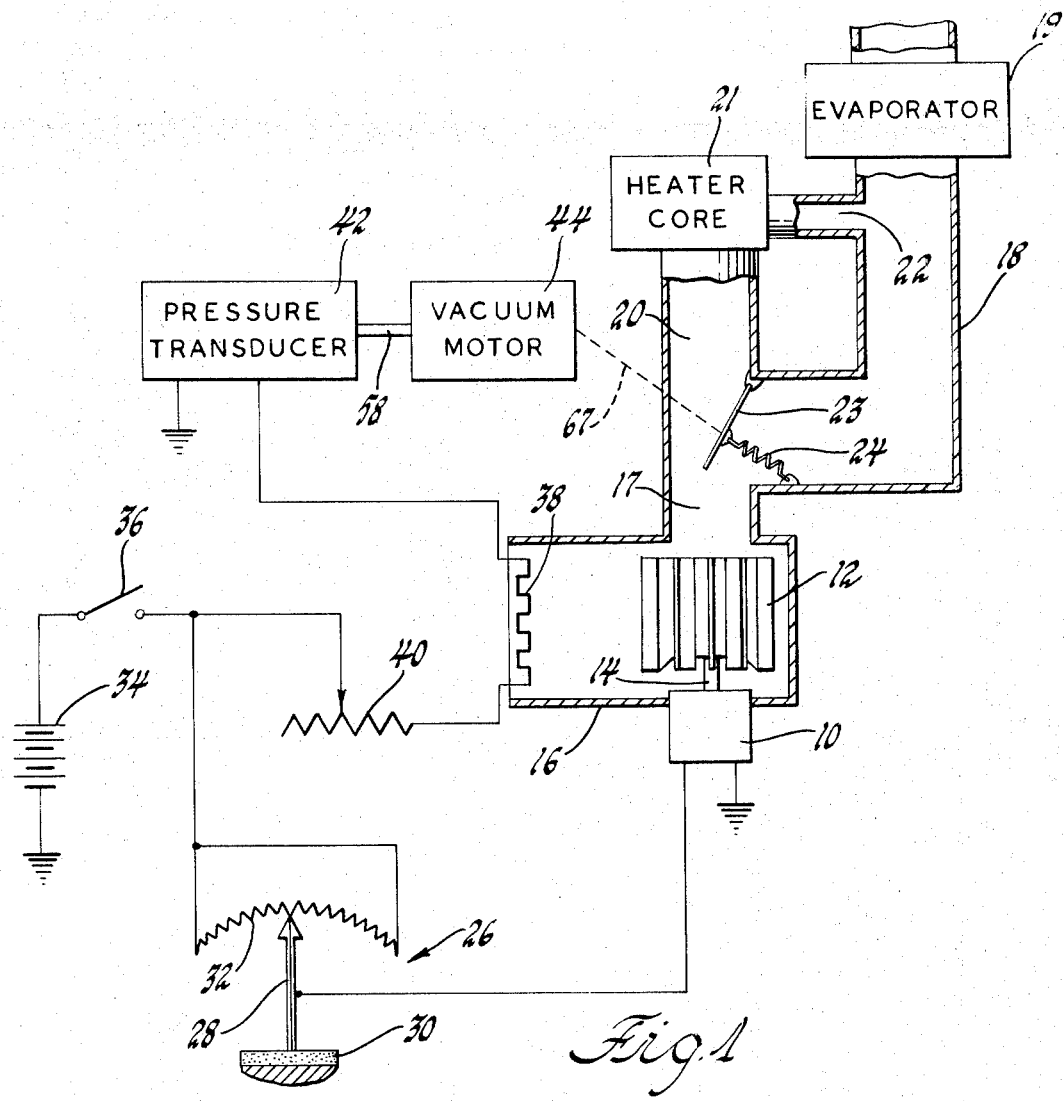
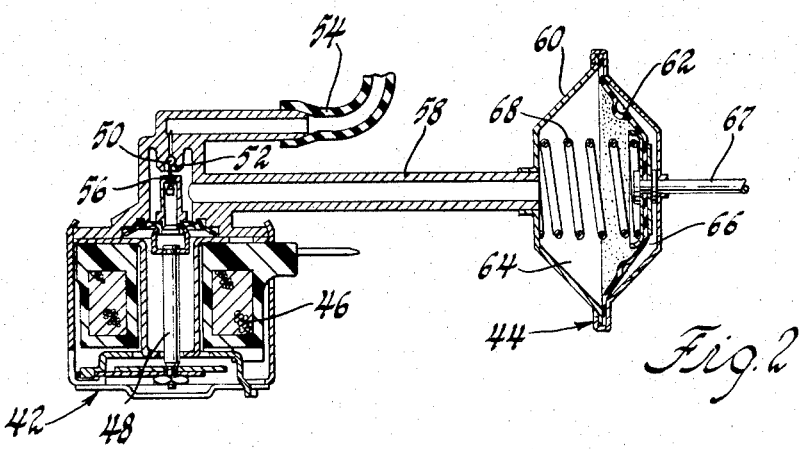
Fig.1
Fig.2

HOT WIRE CONTROL FOR VEHICLE AIR CONDITIONING

This invention relates to a vehicle air conditioning control system and, more specifically, this invention relates to a hot wire control for a vehicle air conditioning system whereby the air impinging on a vehicle occupant from the air conditioning outlet ducts is maintained at a substantially constant effective temperature.

The human body senses a relationship among the flow speed, humidity and temperature of air. Consequently, the effective temperature as sensed by the human body is a function of those factors. Current known vehicle air conditioning systems regulate blower speed and air speed with reference to passenger compartment temperature only. Under some conditions, such as a heat soak condition, a large quantity of very cold air is blown onto the vehicle passengers which, in conjunction with the velocity thereof, produces a very uncomfortable situation. It is the general object of this invention to control the effective temperature of air impinging on a vehicle occupant from a vehicle air conditioning system.

It is another object of this invention to provide a vehicle air conditioning controller in which the air impinging on the vehicle occupant from the air conditioning system is a function of both the temperature and the velocity thereof.

It is another object of this invention to provide for a vehicle air conditioning controller whereby the temperature of the air supplied thereby is a function of the velocity and temperature thereof at the air conditioning outlet ducts and the velocity of the air is a function of the actual temperature of the air within the vehicle compartment.

The foregoing objects are accomplished by controlling the actual temperature of the air output of the air conditioning outlet ducts by the use of a hot wire sensor which is positioned in the output ducts of the air conditioning system. A hot wire sensor, in essence, consists of a fine electrically heated wire which is convectively cooled when placed in an airstream. The resistance of the wire, which varies linearly with its temperature, is related to the speed and temperature of the airstream and the heating current.

The invention may be best understood by reference to the following description of a preferred embodiment and the drawings in which:

FIG. 1 is a schematic drawing of the preferred embodiment for maintaining the air output from the outlet ducts of a vehicle air conditioning system at a substantially constant effective temperature; and FIG. 2 is a schematic drawing illustrating a form of pressure transducer and vacuum motor which can be used in the preferred embodiment of FIG. 1.

Referring to FIG. 1, a blower motor 10 is suitably mounted so that a fan 12 coupled to an output shaft 14 of the blower motor 10 is positioned in an air conditioning outlet duct 16 whose output terminates in the vehicle compartment. A single outlet duct has been shown for illustration purposes only, it being understood that a plurality of outlet ducts downstream of the fan 12 are normally provided. The outlet duct 16 is coupled to a mixing compartment 17 which receives cold dehumidified air from a duct 18 coupled to the output of an evaporator 19 and which receives hot air from a duct 20 coupled to the output of a heater core 21. The heater core 21 receives cold dehumidified air from the duct 18 through a duct 22 and reheats the air passing therethrough. The evaporator 19 and heater core 21 are conventional items and, consequently, are not described in greater detail.

To control the temperature of the air at the output of the outlet duct 16, a valve means shown in the preferred embodiment as a damper 23 pivotally supported so as to define two variable inlet openings to the mixing chamber 17 from the ducts 18 and 20, is provided to control the proportions of cold air and hot air entering the mixing compartment 17 through the ducts 18 and 20, respectively. The damper 23 is spring biased by a spring 24 to close the cold air input to the mixing compartment 17 from the duct 18.

Rotation of the fan 12 is effective for moving air through the evaporator 19, where it is cooled and dehumidified. From the evaporator 19, the air is moved by the fan 12 through the duct 18 into the mixing compartment and/or through the duct 22, the heater core 21 and the duct 20 into the mixing compartment 17. From the mixing compartment 17, the mixed air is moved through and out of the outlet duct 16. The velocity of the mixed air flowing out of the outlet duct 16 is a direct function of the speed of the fan 12. The speed of the blower motor 10 and, consequently the fan 12, is controlled by a temperature sensing unit 26 including a bimetal element 28 fixed on one end to an insulator 30 which is securely attached to the vehicle. The remaining end of the bimetal element 28 functions as a wiper arm relative to a resistor 32. The sensing unit 26 is positioned so as to monitor the temperature within the vehicle compartment. The bimetal element 28 is electrically coupled to the blower motor 10 which in turn is electrically grounded to the vehicle chassis. Both ends of the resistor 32 are coupled to the positive terminal of a voltage source 34, such as the vehicle battery, through an ignition switch 36. The segments of the resistor 32 defined by the wiper arm end of the bimetal element 28 are in parallel and present an impedance in series with the blower motor 10 varying as a function of the position of the bimetal element 28.

The bimetal element 28 senses the vehicle compartment temperature and positions the wiper arm end thereof along the resistor 32 to vary the current input to the blower motor 10. At some predetermined nominal temperature, for example, 72 degrees, the bimetal member 28 is positioned intermediate the ends of the resistor 32 such that a maximum impedance is presented in series with the blower motor 10 which consequently operates at minimum speed. As the temperature of the vehicle compartment deviates from this nominal temperature, the bimetal element 28 moves to position the wiper arm end thereof along the resistor 32 to present a decreasing impedance in series with the blower motor 10 so as to increase the speed thereof. As can be seen from the foregoing, the temperature sensing unit 26 controls the speed of the blower motor 10 and therefore the velocity of the air through the outlet duct 16 as a function of the passenger compartment temperature and, as such, tends to maintain the compartment temperature at the predetermined temperature.

The damper 23 is positioned so as to maintain the temperature of the air flowing from the outlet duct 16 at a substantially constant effective temperature, taking into consideration the velocity of the air as determined by the speed of the blower motor 10. This is accomplished by a hot wire sensor 38 of the type previously described which is positioned within the outlet duct 16 and which has one side thereof connected to the positive terminal of the vehicle battery 34 through a potentiometer 40 and the vehicle ignition switch 36. The remaining side of the hot wire 38 is connected to a current responsive pressure transducer 42 which is responsive to current input for supplying a regulated vacuum. The regulated output of the pressure transducer 42 is supplied to a vacuum motor 44 which is mechanically coupled to the damper 23. The damper 23 is moved by the vacuum motor 44 against the return force of the spring 24 to a position determined by the hot wire sensor 38, as hereinafter described, so as to adjust for the proportions of cold and hot air supplied to the mixing compartment 17 from the ducts 18 and 20, respectively, for obtaining the desired effective temperature.

As previously described, the hot wire sensor 38 is an electrically heated wire whose resistance is a function of the velocity and temperature of the air flowing thereby and, therefore, the air moved through the outlet duct 16 by the fan 12. Consequently, as the velocity of the air through the duct 16 varies as a function of the vehicle compartment temperature, the resistance of the hot wire sensor varies therewith, the magnitude of its resistance also being a function of the temperature of the air. Therefore, for a given value of resistance of the potentiometer 40, the hot wire 38 varies its impedance as a function of the temperature and velocity of the air through the outlet duct 16 to vary the current input to the transducer 42. The transducer 42 responds to the change in current and varies the regulated vacuum output thereof to the vacuum motor 44 which positions the damper 23 in a manner so as to maintain the air output of the outlet duct 16 at a constant effective temperature.

Referring to FIG. 2, an example of the form that the transducer 42 and the vacuum motor 44 may take is illustrated. The vacuum transducer 42 is comprised of a solenoid 46 which controls the position of an armature 48. A regulating valve 50 is loosely held by the armature 48. The position of the armature 48 within the solenoid 46 depends upon the amount of current flow passing through the solenoid 46. The armature 48 is spring loaded downward so that when no current flows through the solenoid 46, it is partially pulled out of the windings with the result that the regulating valve 50 is also pulled downward. This opens a port at valve seat 52 so that control vacuum, which is supplied from a vacuum source, such as the vehicle manifold vacuum, through a tubing 54, is high. When current flows through the solenoid 46, the armature 48 moves up into the solenoid so that the regulating valve 50 tends to seat at valve seat 52 and to become unseated at valve seat 56. When the regulating valve 50 unseats at the valve seat 56, small amounts of air bleed in to thereby reduce the control vacuum, which is supplied to the vacuum motor 44 through a tube 58. With full current to the solenoid 46, the regulating valve 50 is fully seated at valve seat 52 and is fully open at valve seat 56 so that control vacuum is zero. As the magnitude of current input to the solenoid 46 is varied, the regulated vacuum input to the vacuum motor 44 is varied.

The vacuum motor 44 is comprised of a housing 60 in which a diaphragm 62 forms a sealed chamber 64 and an open chamber 66. An output shaft 67 is coupled to the diaphragm 62 and the damper 23 to effect movement of the damper 23. A spring 68 biases the diaphragm 62 and the attached output shaft 67 in a manner so as to position the damper 23 to close off the duct 18 and open the duct 20. When regulated vacuum is supplied to the vacuum motor 44 through the tube 58, the differential pressure acting on the diaphragm 62 moves the diaphragm 62 against the force of the spring 68 to position the damper 23 at intermediate positions to obtain the desired proportions of hot and cold air.

To illustrate the operation of the hot wire control, it will be assumed that the vehicle is under heat soak conditions. When the ignition switch 36 is closed, maximum power is applied to the blower motor 10, as the bimetal element 28 has positioned itself to an extreme end of the resistor 32 in response to the high temperature sensed thereby. Consequently, the air through the outlet duct 16 is at maximum velocity. The hot wire element 38 is responsive to the temperature and velocity of the air and assumes a resistance which causes the transducer 42 to supply a control vacuum to the vacuum motor 44 to position the damper 23 to a position for supplying air through the outlet duct 16 at a predetermined effective temperature. It will be understood by one skilled in the art that at a maximum blower speed, it is necessary that the actual temperature of the air through the outlet duct 16 be at least less than the temperature required to position the bimetal element 28 for maximum blower speed. In this manner, the actual temperature within the vehicle compartment will decrease, which in turn results in the decrease of the speed of the blower motor 10, with the hot wire element 38 sensing the decrease in speed for repositioning the damper 23 to maintain the desired effective temperature.

By varying the resistance of the potentiometer 40 of FIG. 1, a vehicle operator may vary the effective temperature to be maintained by the hot wire element 38.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A control system for a vehicle compartment air conditioner having an evaporator for cooling air passing there-through and a heater core for heating air passing therethrough comprising an air mixing compartment having first and second inlet openings and an outlet opening; first air passage means for transporting heated air from the heater core to the first inlet opening; second air passage means for transporting cold air from the evaporator to the second inlet opening; an outlet duct for transporting air from the outlet opening of the air mixing compartment to the vehicle compartment; valve means for controlling the proportions of heated and cold air entering the mixing compartment through the first and second inlet openings; variable speed fan means responsive to vehicle compartment temperature for causing air to flow through the evaporator, the heater core, the first and second air passages, the mixing compartment, and the outlet duct into the vehicle compartment at a velocity related to vehicle compartment temperature; an electrically heated temperature responsive element placed in the outlet duct and responsive to the velocity and temperature of the air flowing therethrough for assuming an impedance related to the effective temperature of said air; and a valve controller coupled to the valve means and responsive to the impedance of the electrically heated temperature responsive element for positioning the valve means to control the proportions of heated and cold air entering the mixing compartment through the first and second inlet openings in a manner to maintain the effective temperature of the air entering the vehicle compartment through the outlet duct.

2. A control system for a vehicle compartment air conditioner having an evaporator for cooling air passing therethrough and a heater core for heating air passing therethrough comprising an air mixing compartment having first and second inlet openings and an outlet opening; first air passage means for transporting heated air from the heater core to the first inlet opening; second air passage means for transporting cold air from the evaporator to the second inlet opening; an outlet duct for transporting air from the outlet opening of the air mixing compartment to the vehicle compartment; valve means for controlling the proportions of heated and cold air entering the mixing compartment through the first and second inlet openings; variable speed fan means responsive to vehicle compartment temperature for causing air to flow through the evaporator, the heater core, the first and second air passages, the mixing compartment, and the outlet duct into the vehicle compartment at a velocity related to vehicle compartment temperature; a series circuit including a power source for supplying current through the series circuit, pressure transducer means, and an electrically heated temperature responsive element placed in the outlet duct and responsive to the velocity and temperature of the air flowing therethrough for varying the impedance of the series circuit to vary the magnitude of the current flowing through the pressure transducer means, said pressure transducer means being responsive to the current flowing therethrough for supplying a controlled pressure related to the magnitude of said current; and pressure responsive power means coupled to the pressure transducer means and responsive to the controlled pressure supplied thereby for positioning the valve means to control the proportions of heated and cooled air entering the mixing compartment through the first and second inlet openings in a manner to maintain the effective temperature of the air entering the vehicle compartment through the outlet duct.

3. A control system for a vehicle compartment air conditioner having an evaporator for cooling air passing therethrough and a heater core for heating air passing therethrough comprising an air mixing compartment having first and second inlet openings and an outlet opening; first air passage means for transporting heated air from the heater core to the first inlet opening; second air passage means for transporting cooled air from the evaporator to the second inlet opening; an outlet duct for transporting air from the outlet opening of the air mixing compartment to the vehicle compartment; valve means for controlling the proportions of heated and cooled air entering the mixing compartment through the first and second inlet openings; a first series circuit including a voltage source, a variable speed fan means for causing air to flow through the evaporator, the heater core, the first and second air passages, the mixing compartment, and the outlet duct into the vehicle compartment at a velocity directly related to the speed of said fan means, and a temperature responsive impedance means responsive to vehicle compartment temperature for presenting to the first series circuit an impedance having a maximum magnitude when the temperature of the vehicle compartment is at a predetermined temperature and having an impedance decreasing therefrom as the vehicle compartment temperature varies from the predetermined temperature, the variable speed fan means having a speed inversely proportional to the impedance of the first series circuit; a second series circuit including the voltage source, a pressure transducer means, and an electrically heated temperature responsive element placed in the outlet duct and responsive to the velocity and temperature of the air flowing therethrough for presenting an impedance to the series circuit that is related to the effective temperature of said air to vary the current through the pressure transducer, the pressure transducer being responsive to the magnitude of the current therethrough for supplying a regulated pressure having a magnitude related to said current; and pressure responsive means coupled to the pressure transducer and the valve means and responsive to the regulated pressure supplied by the pressure regulator for positioning the valve means to control the proportions of heated and cooled air entering the mixing compartment through the first and second inlet openings in a manner to maintain the effective temperature of the air entering the vehicle compartment through the outlet duct.

\* \* \* \* \*